United States Patent Office 3,329,515
Patented July 4, 1967

3,329,515
PROCESS FOR THE PRODUCTION OF VERY STRONG BRIQUETTES
Friedrich Leopold, Millstatt, Carinthia, Austria, assignor to Osterreichisch-Amerikanische Magnesit Aktiengesellschaft, Radenthein, Carinthia, Austria, a corporation of Austria
No Drawing. Filed Sept. 16, 1965, Ser. No. 487,891
Claims priority, application Austria, Sept. 18, 1964,
A 8,018/64
8 Claims. (Cl. 106—58)

The invention concerns a process for the production of very strong briquettes from finely comminuted natural or synthetic magnesium compounds which form magnesia on burning, in particular from raw magnesite freed of impurities by the floatation process.

With one known process for the production of briquettes from magnesium compounds, the magnesia-yielding compounds used as the initial material are mixed with flue dust or flying dust obtained during the burning of magnesite and with salts or their solutions that have a neutral or basic reaction, in particular magnesium sulfate and preferably kieserite (natural magnesium sulfate from Stassfurt region of Germany) or Epsom salts, in the absence of salts or their solutions that have an acid reaction, and this mixture is made into briquettes (Exhibited Text DAS 1,078,925 of a German patent application). The green strength, that is the strength in the undried state, of briquettes of this kind can be increased substantially when the mixture that is to be made into briquettes is compressed only after it has stood for some time: at least 20 minutes and up to 80 minutes, and preferably 45 to 60 minutes, and when the material is during this time moved mechanically, shaken for example. The briquettes obtained can also be subjected to a final hardening by the action of warm air, or of warm or hot waste gases containing carbon dioxide, and by then being sprayed or sprinkled with water (Austrian Patent 228,695). Through this final hardening and the action of the water it is possible to greatly increase the strength of the briquettes in comparison with briquettes that are only air-dried.

It has now been discovered, in a surprising manner, that the green strength and also the strength of the briquettes can be quite considerably increased in comparison with processes known up to the present time, when during the aforesaid process the mixture from which the briquettes are to be made is first subjected to the action of gaseous carbon dioxide, and pressed only after this is done. It has furthermore been discovered that it is not at all necessary to make use of salts or their solutions that have a basic or neutral reaction; however, when they are used, which is preferably the case, then they must not be exposed to carbon dioxide only prior to the treatment, but they may be added for the first time only after the carbon dioxide has acted, or else before and after the action of the carbon dioxide.

The invention accordingly concerns a process for the production of briquettes, having great green strength and great strength, from finely comminuted natural or synthetic magnesium compounds that yield magnesia when burned, and in particular from substantially pure raw magnesite (freed of impurities by the flotation process), whereby the magnesium compounds used as initial materials are mixed with flue dust or flying dust obtained during the burning of magnesite (magnesite flue dust), and furthermore on occasion with salts having a neutral or basic reaction, in particular magnesium sulfate, preferably kieserite or Epsom salts, in the absence of salts having an acid reaction, and the mixture obtained in this way, preferably after standing for a period of approximately 30 to 60 minutes, is pressed into briquettes, which are then on occasion subjected to a final hardening, and this process is characterized in that the mixture is subjected to the action of gaseous carbon dioxide, and is only after this pressed into briquettes.

The carbon dioxide does not need to be used in a pure form, but can advantageously be used in the form of waste gases that contain carbon dioxide.

By the above designation "salts having a neutral or basic reaction" is to be understood salts that do not have an acid reaction; that is, salts which in an aqueous solution have a pH value of 7 or more than 7. These salts react with almost all the active centers of the caustic magnesia, such as is obtained in the burning of magnesite in the flying flue dust, while simultaneously forming compounds of the magnesia-cement kind, which in their turn are capable of effecting a hardening, and thus an intimate cementing together, of the particles of the initial material containing magnesium. The salts are preferably used in quantities of approximately 0.3% to 1.5% relative to the mixture of magnesium compounds and flying flue dust. The term "salts" as used herein includes the salt of such as well as solutions thereof.

The improved green strength and strength of the briquettes or pressed articles obtained in accordance with the process of the invention is evident from the following comparative tests. There served as the initial material for these tests mixtures of 78% flotation concentrate of raw magnesite (having a water content of approximately 6% to 8%) and 22% of magnesium flying flue dust, in the one case without any addition, and in the other case with an addition of 50 cubic cm. of magnesium sulfate lye, 30° Bé (about 300 grams of $MgSO_4$, per liter) to 1500 grams of the mixture. The magnesium sulfate content of these mixtures accordingly amounted to approximately 1%. The mixtures of the aforesaid two and three components respectively were investigated in the form of cylindrical pressed specimens of 5 cm. diameter and 5 cm. height, which had been pressed using a pressure of 800 kg./sq. cm. The results were as follows:

(a) *Mixtures without magnesium sulfate*

Pressed specimens made from mixtures that stood for 20 minutes without any carbon dioxide treatment before being pressed had a green strength of 11 kg./sq. cm.; the strength of the pressed specimen, after standing for 24 hours in the air, amounted to 38 kg./sq. cm.

Mixtures that were subjected for 15 minutes to the action of pure carbon dioxide and were then pressed had a green strength of 42 kg./sq. cm.; and their strength after standing for 24 hours in the air amounted to 124 kg./sq. cm.

(b) *Mixtures with magnesium sulfate*

Pressed specimens made from mixtures that stood for 20 minutes without any carbon dioxide treatment before being pressed had a green strength of 9.4 kg./sq. cm.; when these pressed specimens had stood for 24 hours in the air their strength was 103.7 kg./sq. cm.

Mixtures that were subjected for 15 minutes to the action of a pure carbon dioxide atmosphere and were then pressed yielded pressed specimens having a green strength of 34 kg./sq. cm.; and their strength after standing for 24 hours in the air amounted to 195 kg./sq. cm.

Approximately the same results were obtained when use was made of waste gases at a temperature of 270 to 280° C. and having an approximately 10% content of carbon dioxide.

With a modification of the tests in that the two kinds of pressed specimens described in (b) were directly after being pressed subjected for 20 minutes, upon a hardening grating, to the action of carbon dioxide, the strength figures were in the case of mixtures pressed without a previous $CO_2$ treatment 97 kg./sq. cm.; and as against this they were 176 kg./sq. cm. in the case of mixtures pressed only after they had had the $CO_2$ treatment.

(c) *An addition of magnesium sulfate at different points of time*

A further increase of the strength of briquettes could be obtained when the unpressed mixture containing magnesium sulfate, after being treated with carbon dioxide, was directly before being made into briquettes mixed again with an aqueous solution of magnesium sulfate, in particular a solution of 29 to 32° Bé., and preferably approximately 30° Bé. In this case the magnesium sulfate should be added in such quantities that the $MgSO_4$ content of the whole mixture amounts to about 0.3% to 1.5%. The strength is hereby increased some 60% to 90%, as against which the green strength is increased only some 20% to 25%. Still better green strengths and strengths are obtained when there is subjected to the carbon dioxide treatment only a mixture of the magnesium-containing initial substances and flying flue dust, without any salts having a neutral or basic reaction, and when these salts are added for the first time, in the aforesaid quantities and in the aforesaid concentrations, only after the treatment with carbon dioxide, but before the pressing operation.

It is thus evident that both the green strength and also the final strength of the pressed articles or briquettes are increased substantially through the treatment with carbon dioxide, in accordance with the process of the invention, prior to the pressing operation. This increase is retained even after a treatment on the hardening grating. The absorption of $CO_2$ by the mixtures and pressed specimens hereby amounts to approximately 1%. During its treatment with carbon dioxide, or with waste gases containing carbon dioxide, the mixture must in all cases contain water. When there are present in the mixture, subjected to the action of carbon dioxide, no salts having a neutral or basic reaction, then the treatment with carbon dioxide must be done at a higher temperature, that is for example with hot waste gases containing carbon dioxide, for example such gases having a temperature from 250 to 280° C.

The quantity of flying flue dust to be used in the process of the invention amounts to from 5% to 30%, and preferably 15% to 25%, relatively to the mixture of the initial magnesium-containing material and the flying flue dust.

What is claimed is:

1. In the manufacture of magnesium carbonate-containing briquettes which form magnesia on burning wherein a moist mixture of magnesium carbonate and magnesite flue dust, containing from about 5 to about 30%, by weight, of the latter, is pressed into briquettes, the improvement providing briquettes of improved green strength and dried strength which comprises contacting said mixture with a gas containing at least about 10% of carbon dioxide before pressing into briquettes.

2. The improvement of claim 1 wherein said magnesium carbonate is substantially pure raw magnesite.

3. The improvement of claim 1 wherein magnesium sulfate, in an amount from about 0.3 to about 1.5%, by weight, is also mixed in said mixture.

4. The improvement of claim 3 wherein said magnesium sulfate is in the form of an aqueous solution thereof.

5. The improvement of claim 4 wherein said magnesium sulfate solution is mixed in said mixture after contacting said mixture with said gas.

6. The improvement of claim 5 wherein magnesium sulfate solution is also mixed in said mixture before contacting said mixture with said gas, the total amount of magnesium sulfate mixed with said mixture being from about 0.3 to about 1.5%, by weight.

7. The improvement of claim 4 wherein said aqueous solution of magnesium sulfate is 29° to 32° Bé.

8. The improvement of claim 1 wherein said mixture is contacted with said gas containing at least about 10% of carbon dioxide until said mixture has absorbed about 1% of carbon dioxide.

References Cited

UNITED STATES PATENTS

| | | | |
|---|---|---|---|
| 2,536,073 | 1/1951 | McGarvey | 264—82 |
| 2,640,759 | 6/1953 | Hughey | 106—58 |
| 2,656,279 | 10/1953 | Heuer | 106—58 |

TOBIAS E. LEVOW, *Primary Examiner.*

HELEN M. McCARTHY, *Examiner.*

J. E. POER, *Assistant Examiner.*